United States Patent [19]

Brault

[11] 4,136,846
[45] Jan. 30, 1979

[54] COMPOSITE STRUCTURE

[75] Inventor: Paul C. Brault, Bellevue, Wash.

[73] Assignee: Boeing Commercial Airplane Company, Seattle, Wash.

[21] Appl. No.: 752,691

[22] Filed: Dec. 20, 1976

[51] Int. Cl.$^2$ ............................................. B32B 3/12
[52] U.S. Cl. ..................................... 244/123; 428/73; 428/116; 428/408; 428/413; 428/474; 428/524; 428/902
[58] Field of Search .................. 244/91, 123; 428/116, 428/118, 73, 295, 367, 902, 408, 413, 474, 524

[56] References Cited

U.S. PATENT DOCUMENTS

| | | | |
|---|---|---|---|
| 2,750,314 | 6/1956 | Bemmels | 428/354 X |
| 2,809,144 | 10/1957 | Grimes | 428/36 X |
| 3,018,205 | 1/1962 | Barut | 428/116 |
| 3,103,460 | 9/1963 | Picket | 428/118 |
| 3,145,000 | 8/1964 | Mackie | 244/123 |
| 3,349,157 | 10/1967 | Parsons | 156/222 X |
| 3,566,493 | 3/1971 | Poucher et al. | 428/116 X |
| 3,673,057 | 6/1972 | Fairbanks | 428/116 |
| 3,700,535 | 10/1972 | McCoy et al. | 428/367 |
| 3,713,959 | 1/1973 | Rottmayer et al. | 428/116 X |
| 3,953,641 | 4/1976 | Marquis | 428/295 X |
| 4,053,667 | 10/1977 | Smith | 428/116 X |

OTHER PUBLICATIONS

The Title Page, the Verso of the Title Page and p. 544 of Webster's Seventh New Collegiate Dictionary, G&C Merriam Company, Publishers, Springfield, Mass.

*Primary Examiner*—Henry F. Epstein
*Attorney, Agent, or Firm*—Bernard A. Donahue; Morris A. Case

[57] ABSTRACT

A high density honeycomb with a unidirectional reinforcing fiber located on each face makes up a primary load carrying member. A low density honeycomb material in combination with the load carrying member makes up the core of a structural member which is completed by the core being encased in a reinforced plastic.

7 Claims, 2 Drawing Figures

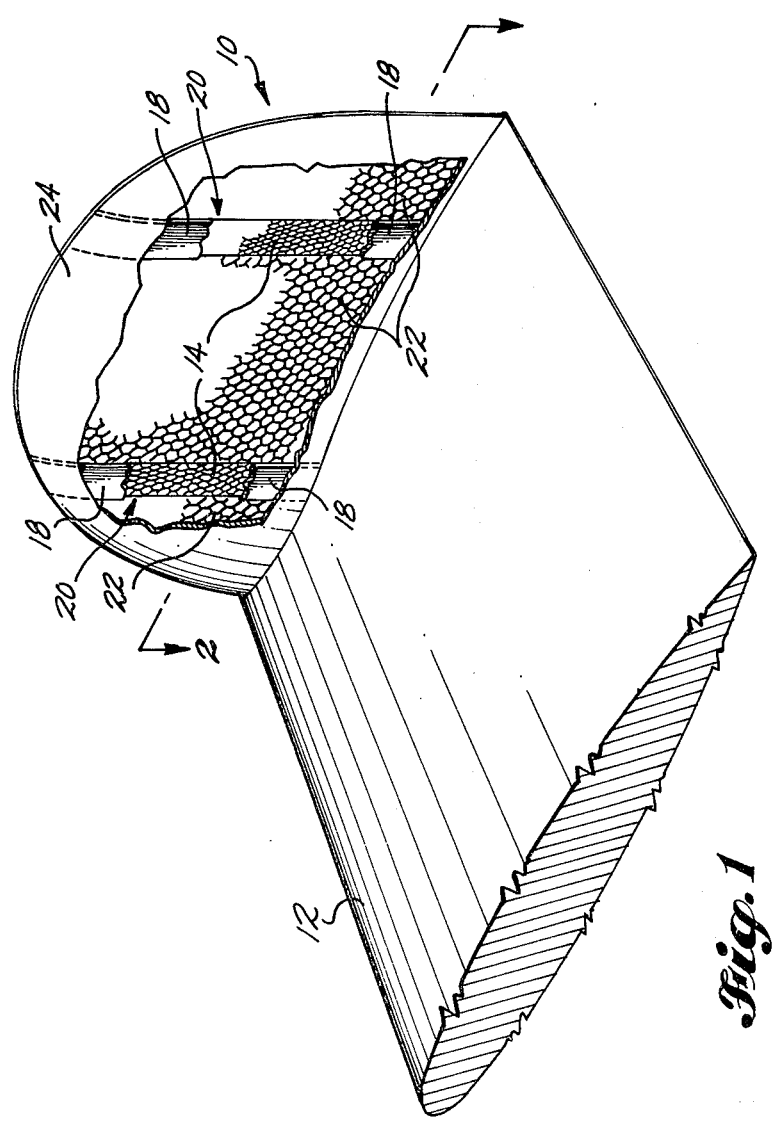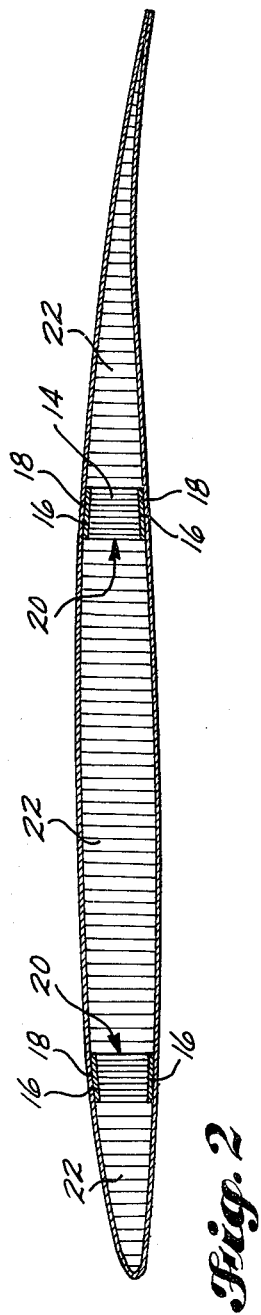

COMPOSITE STRUCTURE

The invention described herein may be manufactured and used by or for the Government of the United States of America for governmental purposes without the payment of any royalties thereon or therefore.

BACKGROUND OF THE INVENTION

In U.S. Pat. No. 3,566,493 a method was disclosed for forming an aerofoil-shaped rotor blade with two outer walls and a honeycomb core having two different densities of honeycomb.

U.S. Pat. No. 3,349,157 discloses a laminated airfoil structure having spanwise grooves filled with spanwise fibers and the laminate covered with fiberglass.

Many airfoil sections require compound curvatures and have a high fineness ratio, so that conventional metallic design requires expensive machined spars, multiple ribs with a high part count, a large number of fasteners and present a closeout problem. It was found that a composite airfoil member could be obtained that had low weight, high torsional stiffness and excellent bending strength.

SUMMARY OF THE INVENTION

A composite structural member has skins of reinforced plastic which encase a honeycomb core. Part of the honeycomb core is of a high density honeycomb that is arranged in a narrow strip with the face on each side of the strip covered with adhering 0° directional graphite fibers that extend lengthwise along the strip to provide a primary load carrying member within the structure.

DESCRIPTION OF THE DRAWINGS

FIG. 1 shows a fragmented section of an airplane wing with a mounted composite fin as practiced by this invention.

FIG. 2 shows a cross section of the fin taken along line 2—2 of FIG. 1.

DETAILED DESCRIPTION

A fin 10 is mounted to wing section 12. The fin has a pair of strips of a high density honeycomb 14 which longitudinally extends outward. This honeycomb is covered on each face 16 with a 0° graphite tape 18 with the unidirectional graphite extending along the length of the strip. The graphite is bonded to the honeycomb strip to make up a primary load carrying member or spar 20. A low density honeycomb core material 22 is located between and also on either side of the load carrying members to make up a core which is encased in a reinforced plastic skin 24 to become the composite structural fin member 10. The honeycomb core is preferably of a plastic material such as a nylon modified phenolic resin; however, it is not intended to limit it to that resin or even to resins as it may be of a metal such as aluminum. The skin is preferably of a glass reinforced epoxy resin, but other reinforcements or other resins may also be used. The unidirectional graphite preferably uses an epoxy adhesive in making up the tape, but other resins may be used. In this embodiment the spars had a uniform width throughout, however in the interest of weight savings the spars may narrow as the spar extends outward, and in addition the graphite tape may be in uniform layers throughout or may be tapered with a fewer number of layers as the member extends outward.

In preparing the fin 10, the core materials 14 and 22 are bonded together, machined on one side, formed to contour in a press, the graphite tape adhesive and skin applied and the assembly cured in a heated bag mold.

I CLAIM:

1. A composite structure comprising: a primary load carrying member of a high density honeycomb strip covered on each face with unidirectional fiber tape to extend lengthwise along the strip, a low density honeycomb core along each side of the primary load carrying member, and a reinforced plastic to cover the core and primary load carrying member to form an integrated structural member.

2. A composite structure as in claim 1 wherein the fiber in the unidirectional tape is graphite.

3. A composite structure as in claim 2 wherein the honeycomb in the primary load carrying member and the honeycomb core is plastic.

4. A composite wing fin comprising: a pair of spaced apart longitudinally extending dense honeycomb core members, low density honeycomb cores to extend between and laterally outward from said dense honeycomb core members, a unidirectional lengthwise graphite tape to extend along each face of the dense honeycomb core members to form a pair of spaced apart primary load-carrying members, and a reinforced plastic to encase the honeycomb cores to form a composite wing fin.

5. A composite wing fin as in claim 4 wherein the honeycomb core materials are of metal and the encasing reinforced plastic is a glass reinforced epoxy resin.

6. A composite wing fin as in claim 4 wherein the honeycomb core materials are of plastic and the encasement is of glass reinforced epoxy resin.

7. A composite wing fin as in claim 4 wherein the reinforced plastic honeycomb is of nylon modified phenolic resin and the encasement material is a glass reinforced epoxy resin.

* * * * *